United States Patent [19]

Martens et al.

[11] 4,151,712

[45] May 1, 1979

[54] PROTECTIVE SHUTDOWN SYSTEM FOR COMBINED CYCLE PLANT HAVING A DUAL LIQUID FUEL SYSTEM

[75] Inventors: Alan Martens, Wayne, Pa.; Ronald M. Krawitz, Wilmington, Del.

[73] Assignee: Westinghouse Electric Corp., Pittsburgh, Pa.

[21] Appl. No.: 742,736

[22] Filed: Nov. 17, 1976

[51] Int. Cl.² ............................................. F02C 9/04
[52] U.S. Cl. ......................... 60/39.28 R; 60/39.46 P
[58] Field of Search ................ 60/392.28 R, 39.46 P, 60/243, 261, 223

[56] References Cited

U.S. PATENT DOCUMENTS

| | | | |
|---|---|---|---|
| 2,768,496 | 10/1956 | Stamm | 60/39.46 P |
| 3,022,425 | 2/1962 | Rockstead | 60/39.46 P |
| 3,293,847 | 12/1966 | Rogers | 60/39.28 R |
| 3,738,107 | 6/1973 | Miller | 60/261 |
| 3,777,480 | 12/1973 | Stoltman | 60/39.28 R |
| 3,805,519 | 4/1974 | Plotnick | 60/223 |
| 3,948,043 | 4/1976 | Martz | 60/39.28 R |
| 4,041,695 | 8/1977 | Harper | 60/39.28 R |

Primary Examiner—Louis J. Casaregola
Attorney, Agent, or Firm—E. F. Possessky

[57] ABSTRACT

A gas turbine and an afterburner are operated with a dual liquid fuel system. During protective stops, logic controls are provided for initiating a transfer from operating fuel to a flushing fuel after predetermined conditions are satisfied. After fuel transfer, shutdown is completed without setting trips and restart can be achieved without special prestart preparation of the fuel system.

4 Claims, 22 Drawing Figures

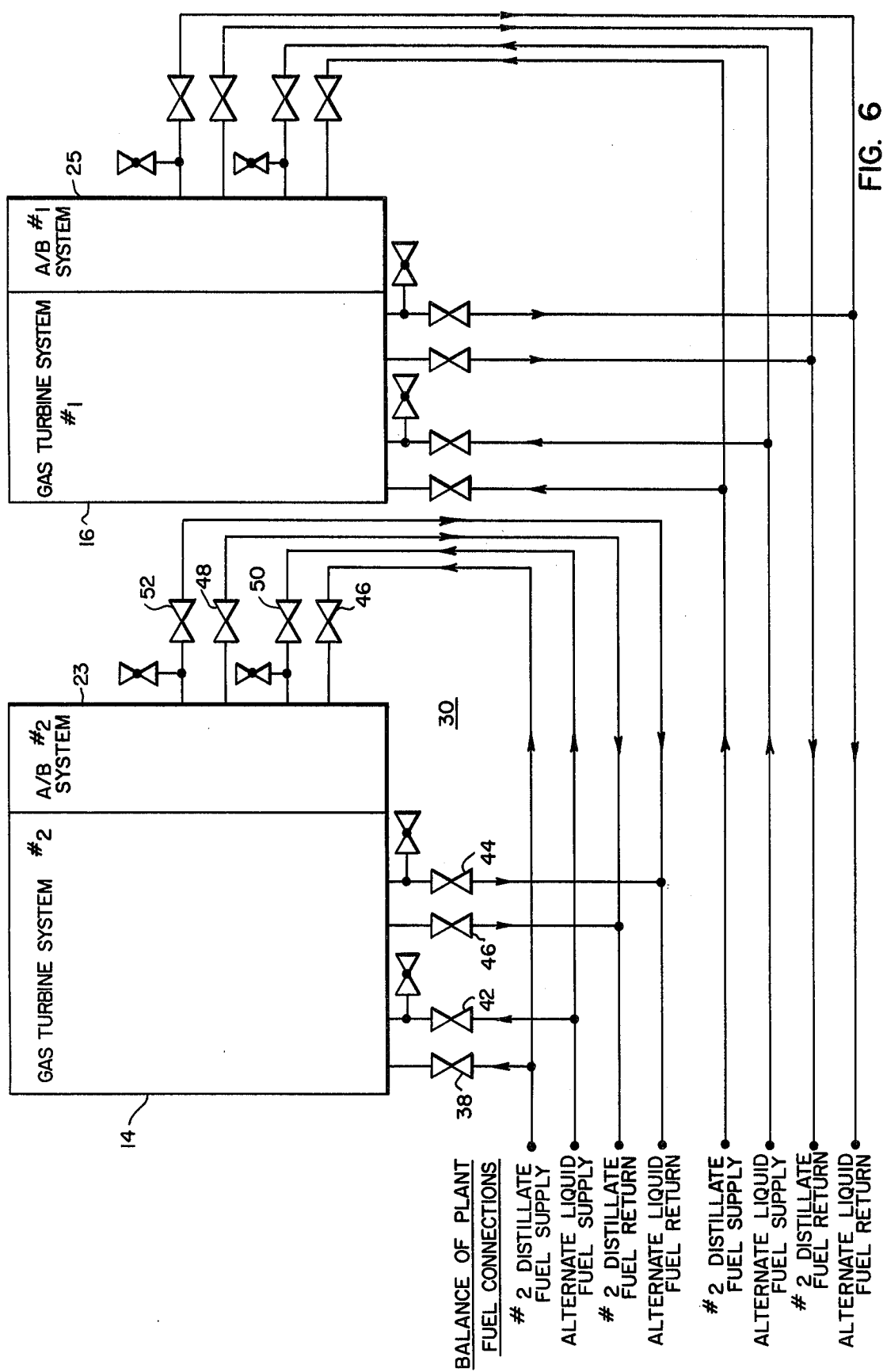

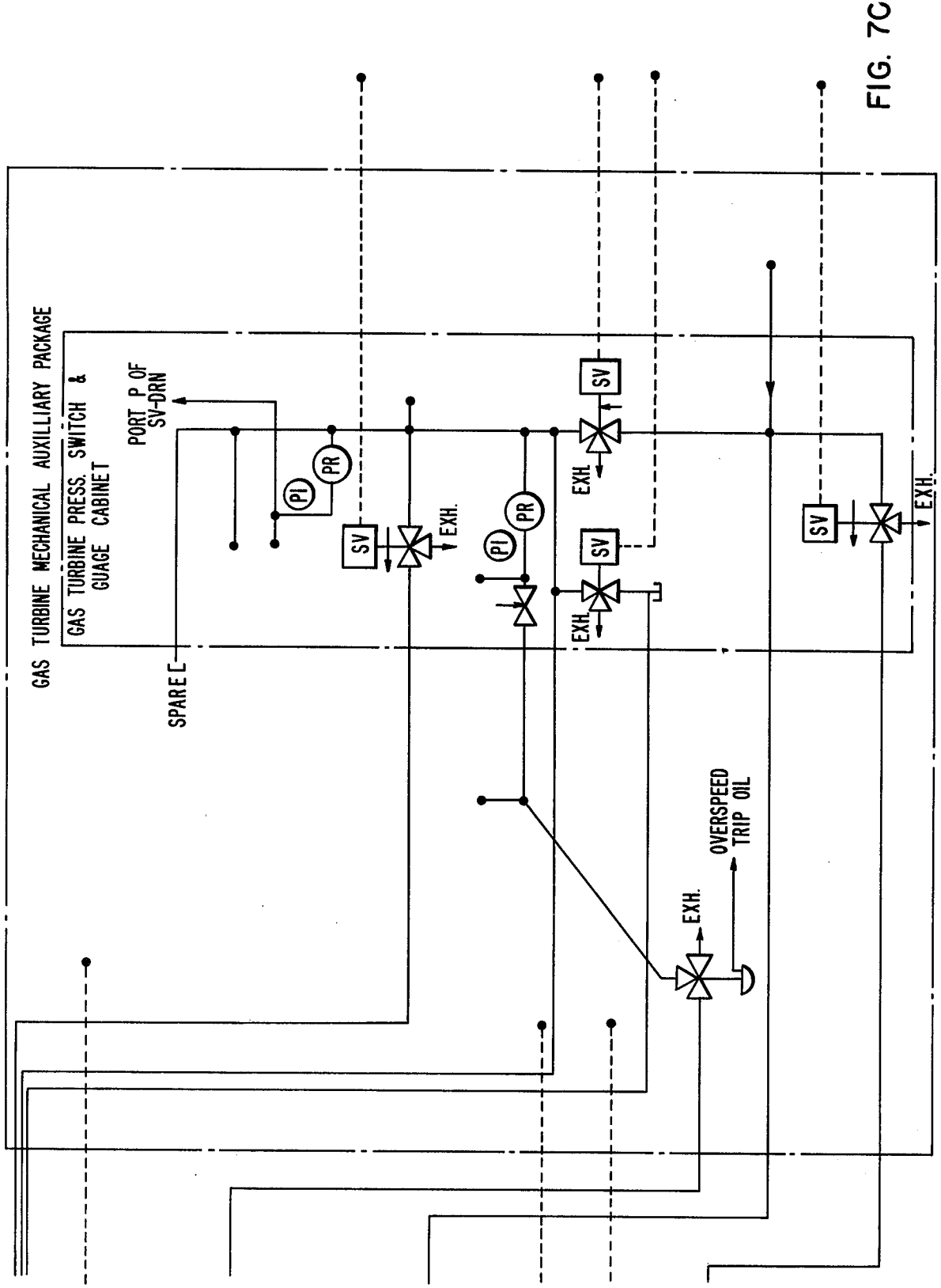

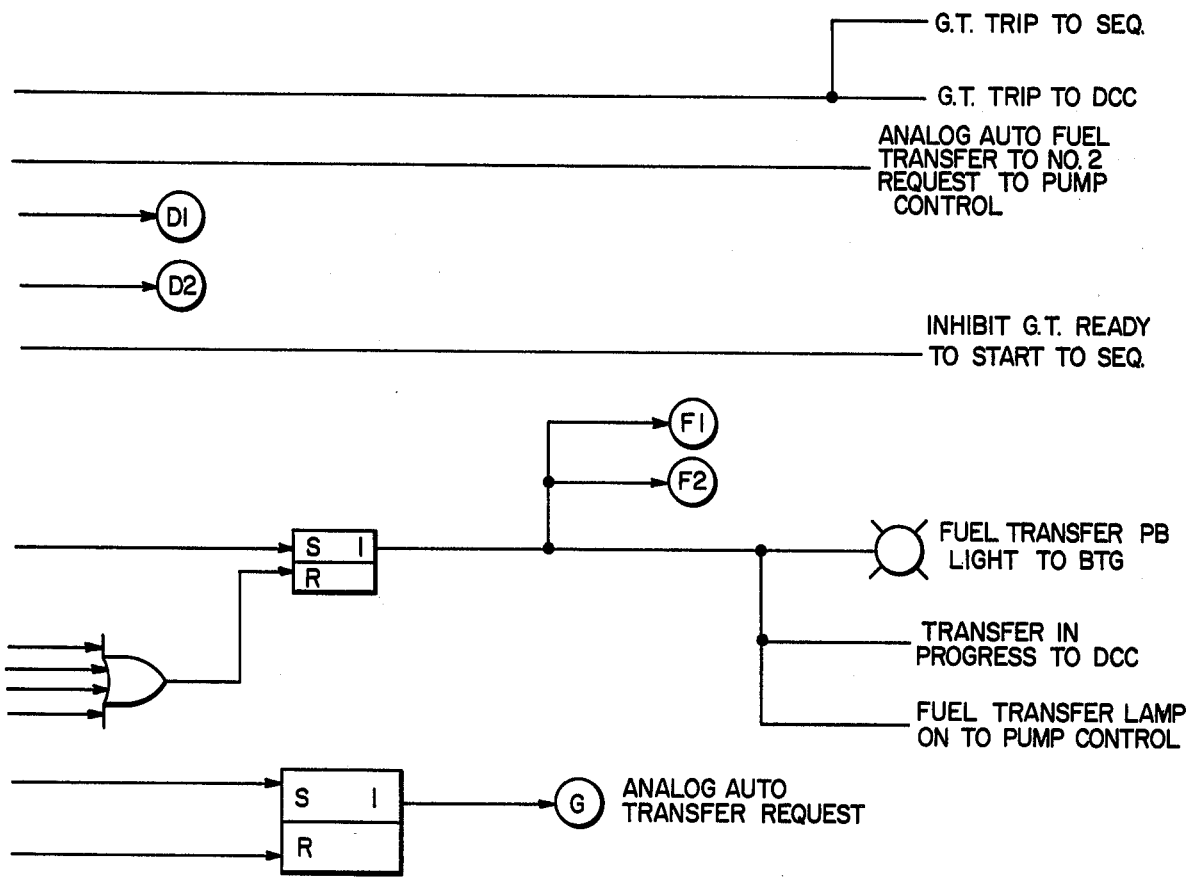
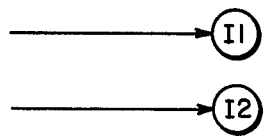
FIG. 8C

PROTECTIVE SHUTDOWN SYSTEM FOR COMBINED CYCLE PLANT HAVING A DUAL LIQUID FUEL SYSTEM

CROSS-REFERENCE TO RELATED APPLICATIONS

Ser. No. 399,790 (pending) entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and filed by L. F. Martz, R. W. Kiscaden and R. Uram on Sept. 21, 1973;

Ser. No. 495,765 (U.S. Pat. No. 3,953,966) entitled "Combined Cycle Electric Power Plant Having A Control System Which Enables Dry Steam Generator Operation During Gas Turbine Operation", assigned to the present assignee and filed by L. F. Martz and R. J. Plotnick on Aug. 8, 1974.

BACKGROUND OF THE INVENTION

The present invention relates to combined cycle plants and more particularly to protective shutdown systems for such plants.

In the combined cycle plants presently supplied to electric power companies, a pair of gas turbines generate hot exhaust gas which is used to produce steam in a pair of heat recovery steam generators. The steam drives a steam turbine and in turn a generator is driven by each of the gas and steam turbines to produce the plant power. An afterburner may or may not be associated with each gas turbine to provide supplemental heating of the turbine exhaust gas.

Various contingencies may occur which require that one of the gas turbines or the entire plant be shut down. A shutdown system is arranged to respond to the occurrence of predetermined plant events and cause a partial or full plant shutdown.

In plants having a dual liquid fuel system, and specifically where one fuel is an ignition fuel requiring no special processing and a heavy or highly volatile fuel requiring special processing, a plant shutdown can result in coagulation of heavy fuels in the fuel lines, dangerous leaking of highly volatile fuels into the hot combustion path, or closing of the burner nozzles after flameoff. Manual prestart preparation of the fuel system is then required before restart of the plant. It is desirable that shutdowns in such plants be enabled to occur safely and orderly such that restarts can occur immediately without requirement for special prestart fuel preparation procedures.

SUMMARY OF THE INVENTION

A system for operating and shutting down a gas turbine-generator comprising a liquid fuel supply system which selectively supplies an ignition quality fuel or a post-ignition quality fuel to the turbine combustors, a speed/load control for said turbine fuel system to supply fuel to said turbine as required during startup and shutdown and during load operations, means for generating protective turbine stop signals and protective turbine trip signals in response to predetermined sensed conditions, and means for controlling said speed/load control and said turbine fuel system to shut said turbine down in an orderly stepped procedure without setting trips when a turbine stop signal occurs, said turbine shutdown controlling means including means for transferring the turbine supply fuel from post-ignition fuel to ignition fuel at a predetermined point in the turbine shutdown so as to flush the post-ignition fuel from the turbine fuel system supply lines.

BRIEF DESCRIPTION OF THE DRAWINGS

FIGS. 6 and 7A–7C show a dual liquid fuel ystem for the plant; and

FIGS. 8A–8C, 9A–9C, 10A–10C, and 11A–11C show the shutdown controls in greater functional block detail.

DESCRIPTION OF THE PREFERRED EMBODIMENT

Figure 1:
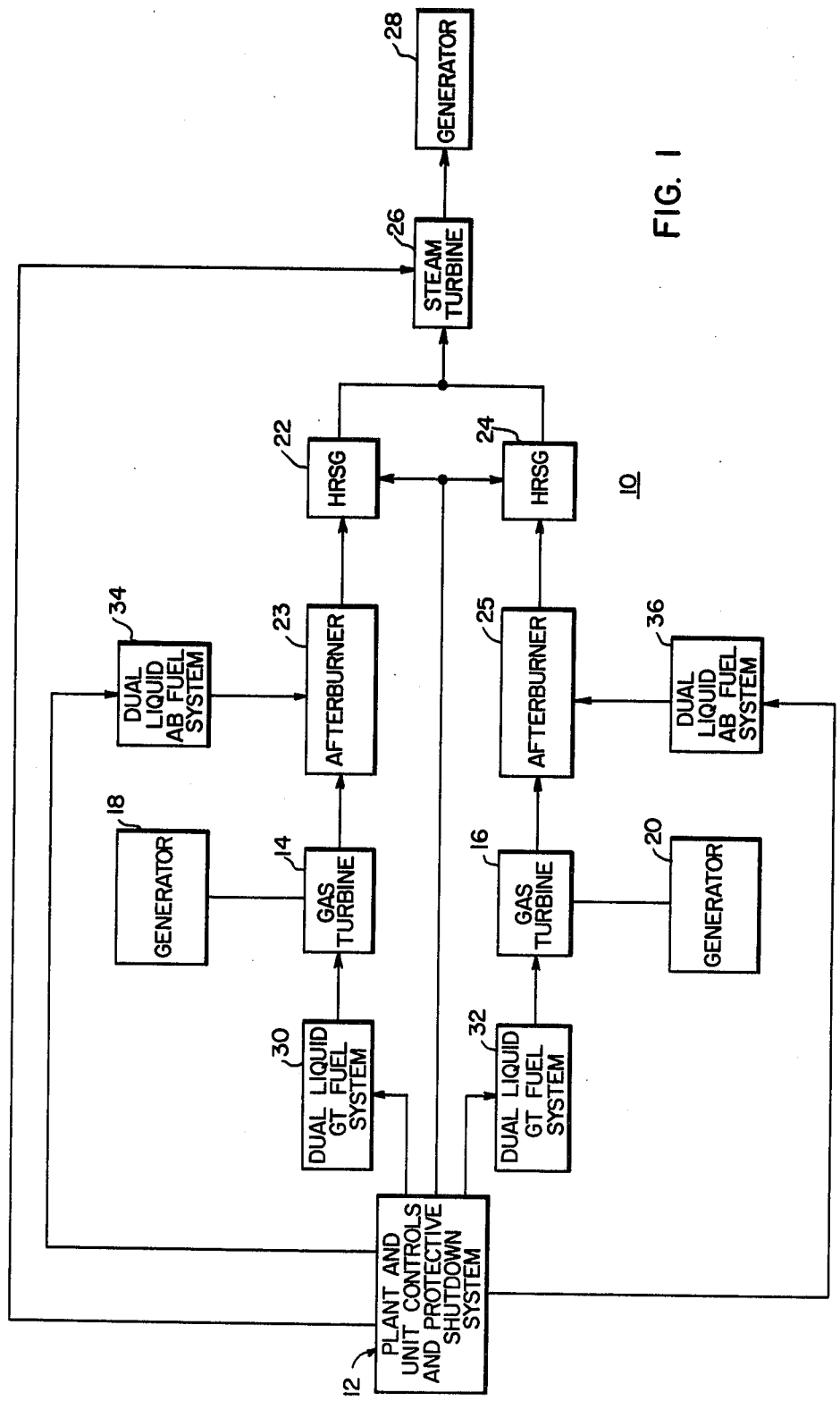
FIG. 1 shows a block diagram of a combined cycle plant in which the present invention is embodied.

In FIG. 1, there is shown a combined cycle plant 10 which is operated by a control and protective shutdown system 12 in accordance with the principles of the invention. As disclosed more fully in the cross-referenced plant applications, gas turbines 14 and 16 drive electric generators 18 and 20 and generate hot gas for the production of steam in heat recovery steam generators 22 and 24. Afterburners 23 and 25 are operated to provide supplemental heat for the turbine exhaust gas. The steam operates a steam turbine 26 which also drives a generator 28. Breakers (not shown) connect the generators to the power system lines.

Dual liquid fuel systems 30, 32, 34 and 36 are respectively employed for the gas turbines and the afterburners. Typically, the fuel systems are respectively supplied with the ignition fuel and a heavy or highly volatile fuel for post ignition use. Provision may also be made for use of natural gas as a fuel. Generally the two liquid fuels are burned in the same nozzles in the gas turbines and the afterburners, and the system 12 selects and controls the liquid fuel to be used.

Figure 2A:
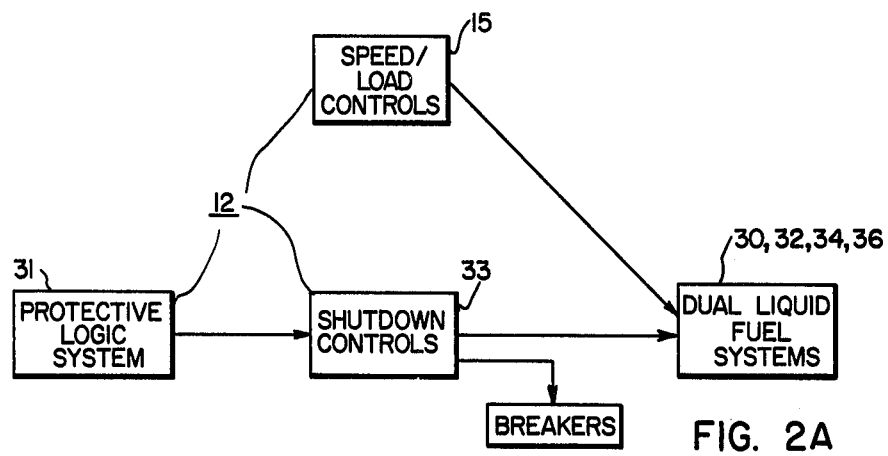
FIG. 2A shows a shutdown control system employed in the plant.
Figure 2B:
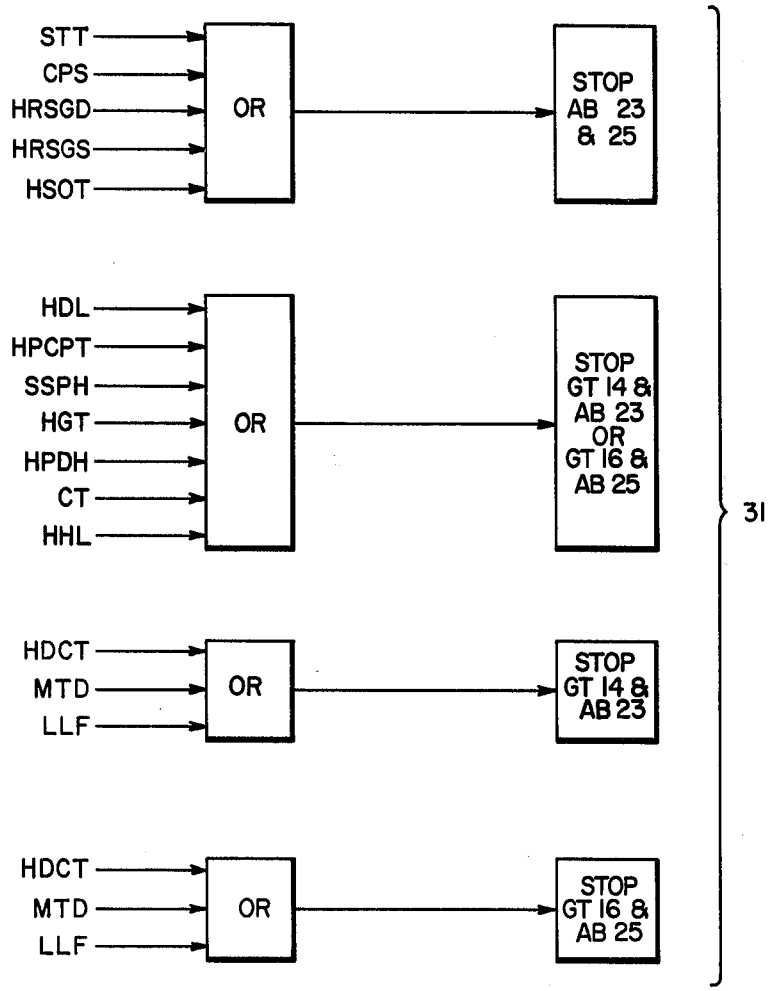
FIG. 2B shows a protective logic control employed with a gas turbine and an afterburner in the plant.

In FIGS. 2A and 2B, there is shown a logic system 31 which is included in the protective shutdown system 12 to generate afterburner and gas turbine protective stop or trip signals for execution by shutdown controls 33 and the fuel system under predetermined operating conditions. Conventional speed/load controls 15 provide fuel control signals for the fuel system during normal speed/load control operations. Generally, a trip condition is one which requires immediate fuel shut-off and turbine and/or afterburner shutdown. A stop condition is one which allows safe turbine shutdown and/or afterburner cutback to occur in a limited time. FIG. 2B shows various conditions which lead to a stop of one or more of the afterburners and gas turbines. In order to avoid fuel coagulation, closing or leakage problems while achieving a safe and orderly stop, the heavy or highly volatile liquid fuel used for running operation is flushed from the fuel system prior to flameoff. The shutdown system includes controls which coordinate the fuel flushing with other shutdown functions.

Figure 3:
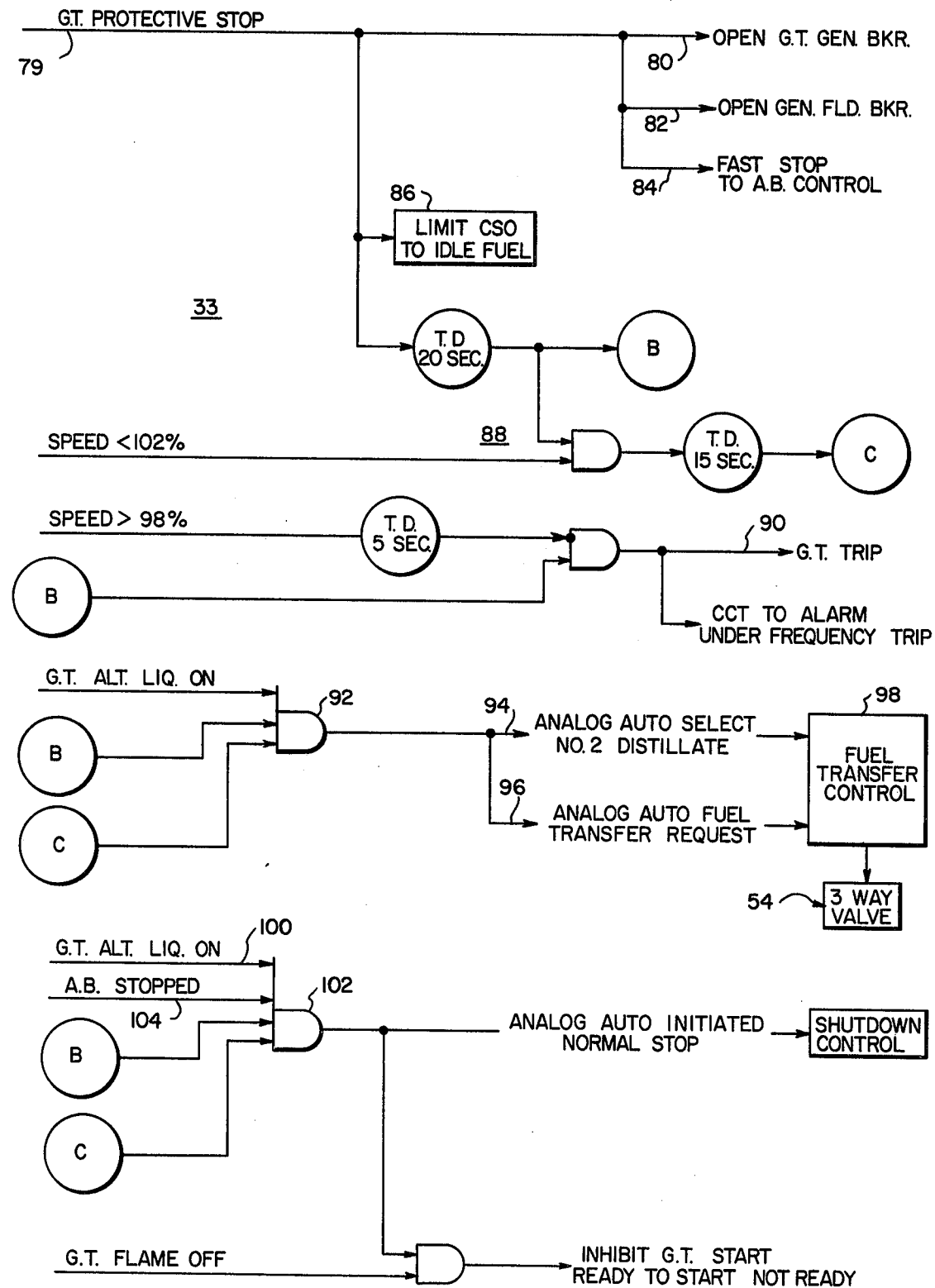
FIG. 3 shows a portion of the shutdown control system which is employed for the gas turbine and the afterburner.

If a protective stop signal indicated at 79 in the shutdown controls 33 in FIG. 3 is generated for a gas turbine, the generator and field breakers are opened as indicated by the reference characters 80 and 82. Further, the speed/load control steps back the fuel reference to that required for idle operation at 98% speed as indicated by signal 84. The associated afterburner is limited to minimum fuel and stopped without tripping as indicated by 86.

Logic circuit 88 determines whether the turbine speed stays below 102% after a delay of 20 seconds and whether the speed is still above 98% after an additional 5 second delay. If both conditions are true, the turbine speed is considered stabilized and fuel transfer is permitted for flushing purposes. If not, the speed control or some other mechanism is presumed faulty and the protective gas turbine stop is superceded by a turbine trip as indicated by signal 90.

Once the turbine speed has stabilized as described, AND block 92 generates a select signal for the flush fuel as indicated by 94 and a fuel transfer request signal as indicated by 96. A fuel transfer control 98 then executes the fuel transfer.

Once the turbine fuel transfer is completed as indicated by NOT block 100, AND block 102 generates a turbine normal stop signal if the afterburner has been stopped as indicated by signal 104 and if the turbine speed is stabilized. If the turbine is stopped before the afterburner is stopped, the afterburner will be tripped which is at least as problematical as a gas turbine trip. A conventional shutdown control 104 executes the normal stop request, i.e., a cooldown cycle is initiated, equipment items are sequenced off and the turbine is stopped without setting trips. The turbine accordingly is then in a ready-to-go state since burning the flushing fuel during the normal stop enables the fuel system to be restarted without special preparation procedures.

An afterburner (AB) trip provides for stopping the afterburner immediately in which case fuel flow is stepped to zero. If the afterburner is burning heavy oil when it is tripped, the heavy oil can coagulate in the fuel lines. Even if the afterburner is restarted before coagulation occurs, the burning properties of the fuel may "coke" the burner. This may require expensive replacement of the burner. If the afterburner is burning a highly volatile fuel, the fuel can vaporize and flow into the boiler inlet duct where it creates a hazardous situation at best. At worst, an explosion can result with hazard to life and damage to the burner and the HRSG.

An AB Protective stop provides for stopping the afterburner so as to avoid the potentially expensive problems associated with an AB trip and without endangering or damaging the afterburner or other plant hardware. This requires the afterburner to stop in the least possible time while burning an ignition fuel.

An AB Normal Stop provides for stopping the afterburner so as to avoid rapid boiler inlet temperature changes, the potentially expensive problems associated with an AB trip, and without endangering or damaging the afterburner or other plant hardware. This requires the afterburner slowly to reduce firing rate to minimum and then transfer to an ignition fuel before stopping.

A time delay TD1 (FIG. 4) allows the afterburner to transfer to ignition fuel. If the transfer takes too long of if the afterburner cannot or will not transfer, the afterburner is tripped after TD1 times out. TD1 is typically between 15 and 90 seconds.

A time delay TD2 (FIG. 5) allows the afterburner to ramp from existing fuel flow to minimum fuel flow with a minimum temperature upset to the boiler. After TD2 times out, the afterburner is transferred to ignition fuel and then stopped. TD2 is typically between 5 and 15 minutes.

The AB Fuel Ramp should take the same amount of time as TD2. This permits the afterburner to burn alternate fuel for as long as possible before transferring to ignition fuel in preparation for stopping. The same function can be accomplished with the time delay and an "AND" gate. Both are equally effective, but use of the "AND" gate is typically less expensive.

Figure 4:
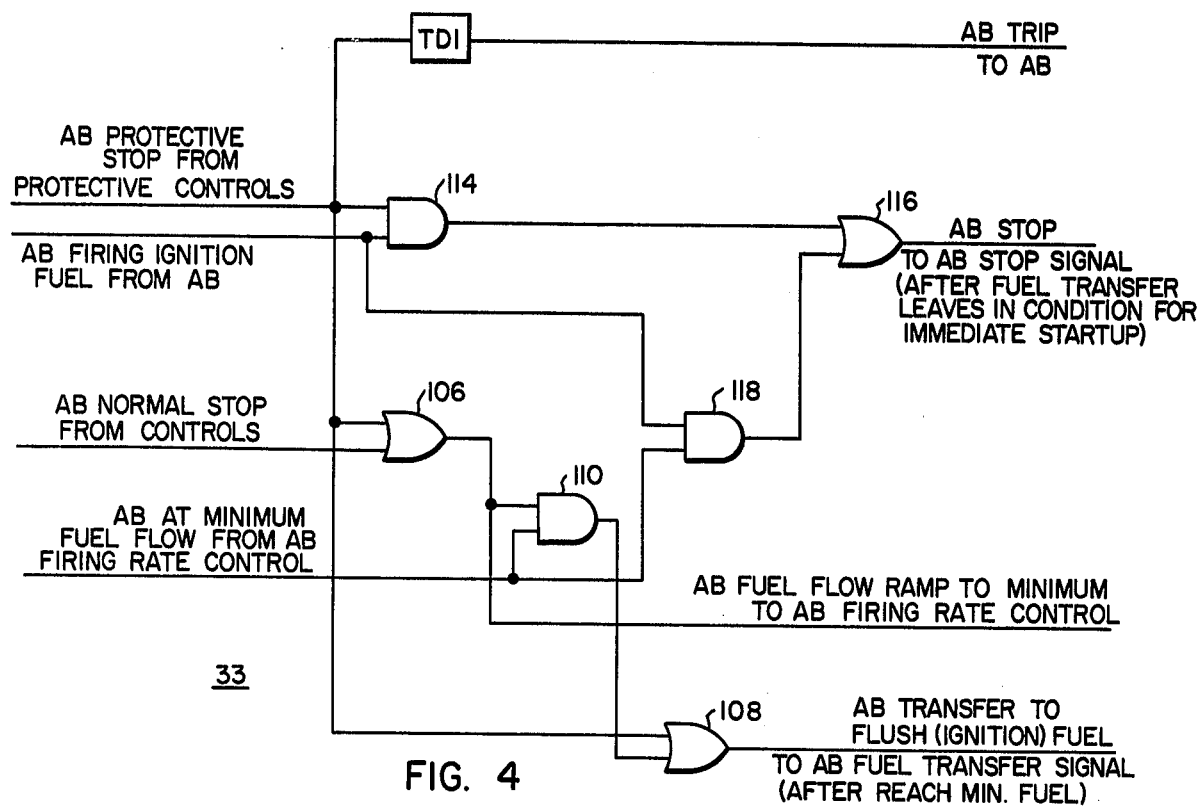
FIGS. 4 and 5 show more detail for the afterburner shutdown control.
Figure 5:
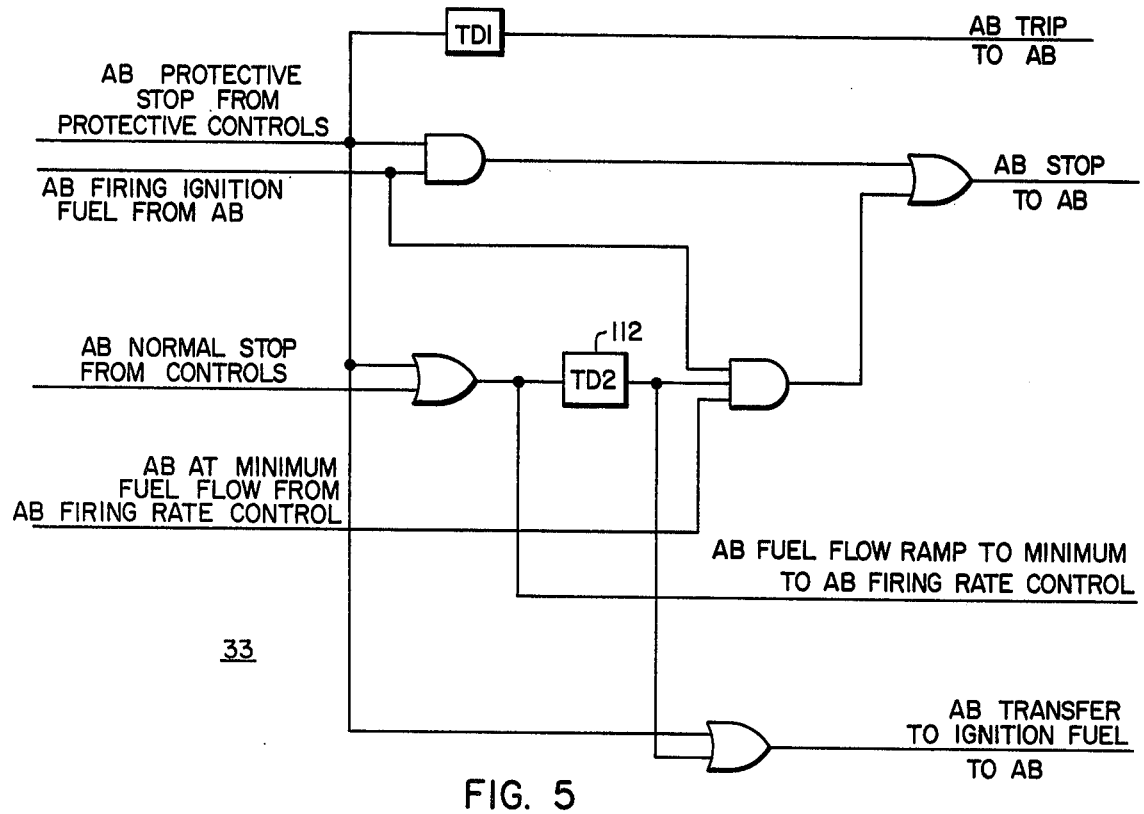

As shutdown in the shutdown controls 33 in FIGS. 4 and 5, OR block 106 generates a signal for ramping fuel to minimum when an AB protective stop or an AB normal stop is generated. OR block 108 generates a signal for transferring the flush fuel once an AB protective stop is generated or once AND block 110 (FIG. 4) indicates an AB normal stop is generated and the AB fuel has been ramped to minimum. In FIG. 5, a time delay block 112 provides an end result similar to that provided by the AND block 110.

After a transfer to flush fuel has occurred, AND block 114 causes an AB Stop signal to be generated by OR block 116. Once stopped in this manner, the afterburner is available for immediate startup. AND block 118 also causes a stop when minimum flush fuel is being supplied to the afterburner.

Typically, as shown for the logic system 30 in FIGS. 2A and 2B, a shutdown system embodied in accordance with the principles of the invention operates in response to conditions including the following in a combined cycle plant or in a simple gas turbine cycle:

[1] A protective stop of afterburners due to a steam turbine trip STT.
[2] A protective stop of afterburners due to stoppage of a condensate pump CPS.
[3] A protective stop of afterburners due to HRSG dry status HRSGD.
[4] A protective stop of afterburners due to HRSG standby status HRSGS.
[5] A protective stop of a gas turbine and afterburner due to high deaerator level HDL.
[6] A protective stop of a gas turbine and afterburners due to H.P. circulation pump trip HPCPT.
[7] A protective stop of gas turbines and afterburners due to high superheater steam pressure SSPH.
[8] A protective stop of afterburners due to high superheater outlet temperature HSOT.
[9] A protective stop of a gas turbine and afterburner due to high gas temperature HGT.
[10] A protective stop of a gas turbine and afterburner due to high H.P. drum level HPDH.
[11] A protective stop of gas turbine and afterburner due to a condenser trip GT.
[12] A protective stop of a gas turbine and afterburner due to high hotwell level HHL.
[13] A protective stop of a gas turbine due to high disc cavity temperature HDCT.
[14] A protective stop of a gas turbine due to low line frequency LLF.
[15] A protective stop of a gas turbine due to main transformer differential, sudden pressure or other failure MTD.

The supply and return parts of the fuel systems for the gas turbines and afterburners are shown in greater detail in FIG. 6. Thus, the gas turbine 14 is provided with supply and return stop valves 38 and 40 for distillate fuel (ignition) and supply and return stop valves 42 and 44 for alternate liquid fuel. Similarly, the afterburner 23 is provided with supply and return stop valves 46 and 48 for distillate fuel and supply and return stop valves 50 and 52 for alternate fuel. The gas turbine 16 and the afterburner 25 are provided with the same arrangement of fuel valves.

Figure 7A:
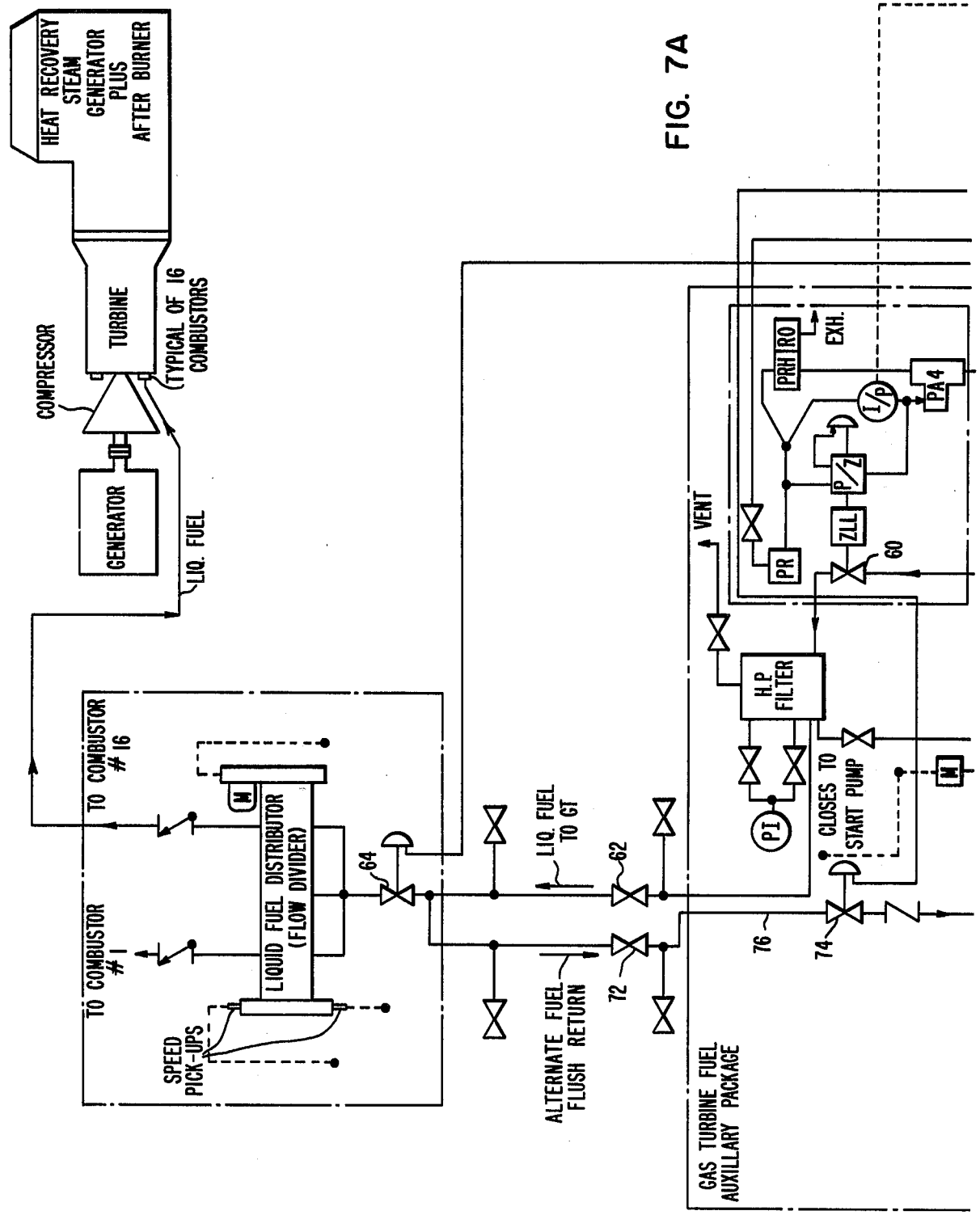
Figure 7B:
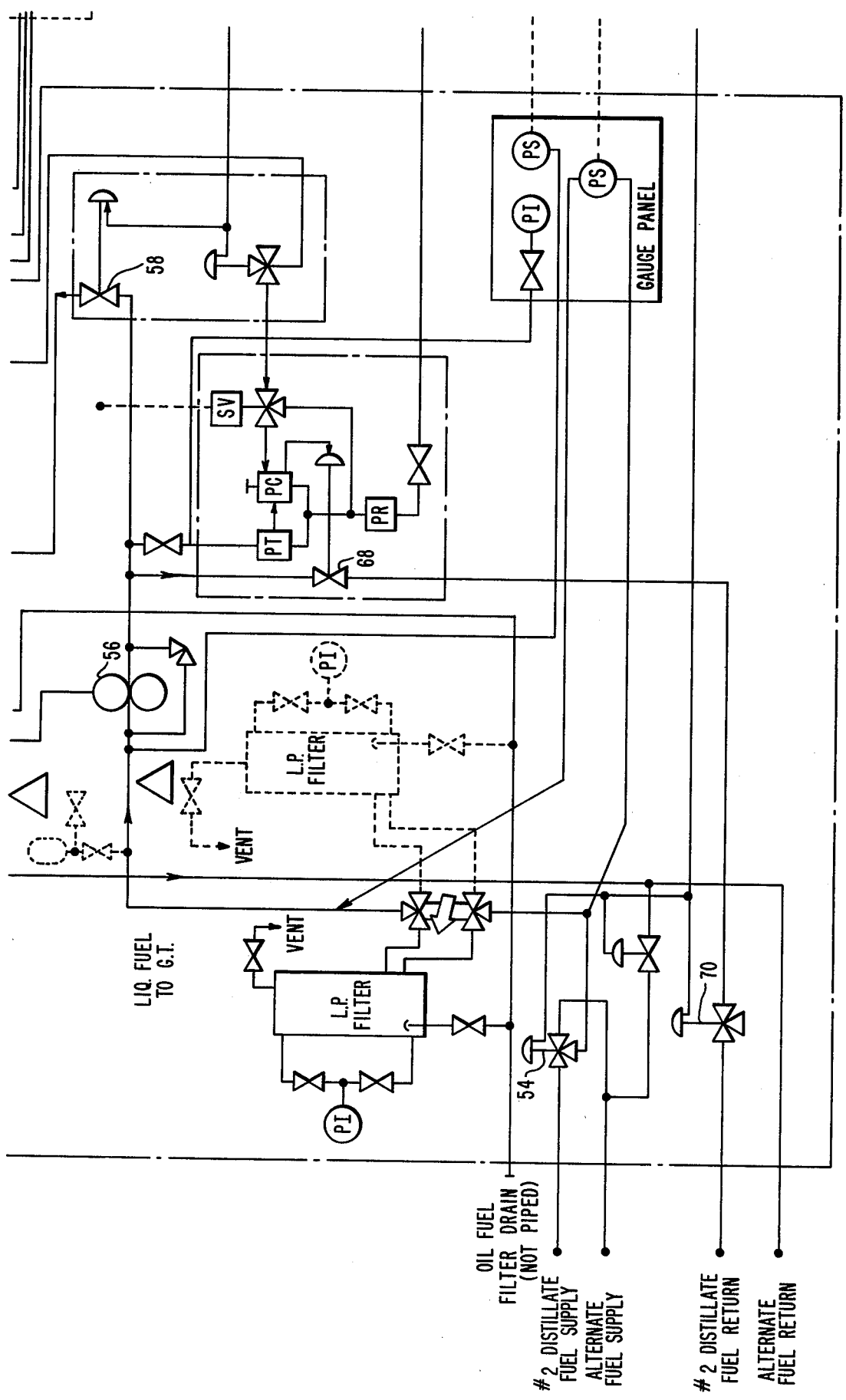

The gas turbine fuel system 30 or 32 is shown in greater detail in FIGS. 7A–7C. A 3-way valve 54 responds to a select signal to supply either distillate or alternate liquid fuel to the turbine combustors under the driving power of a pump 56 through valves 58, 60, 62 and 64. A conventional speed/load fuel control operates the valve 64 to regulate the amount of selected fuel supplied to the combustors as the turbine is accelerated to synchronous speed and under load operation. A bypass valve 68 provides for fuel return through another 3-way valve 70. During flushing operations, valves 72 and 74 provide for alternate fuel return through flush return line 76 when the valve 64 is closed. An arrangement (not shown) generally similar to that shown for each gas turbine is provided for each afterburner.

Figure 8A:
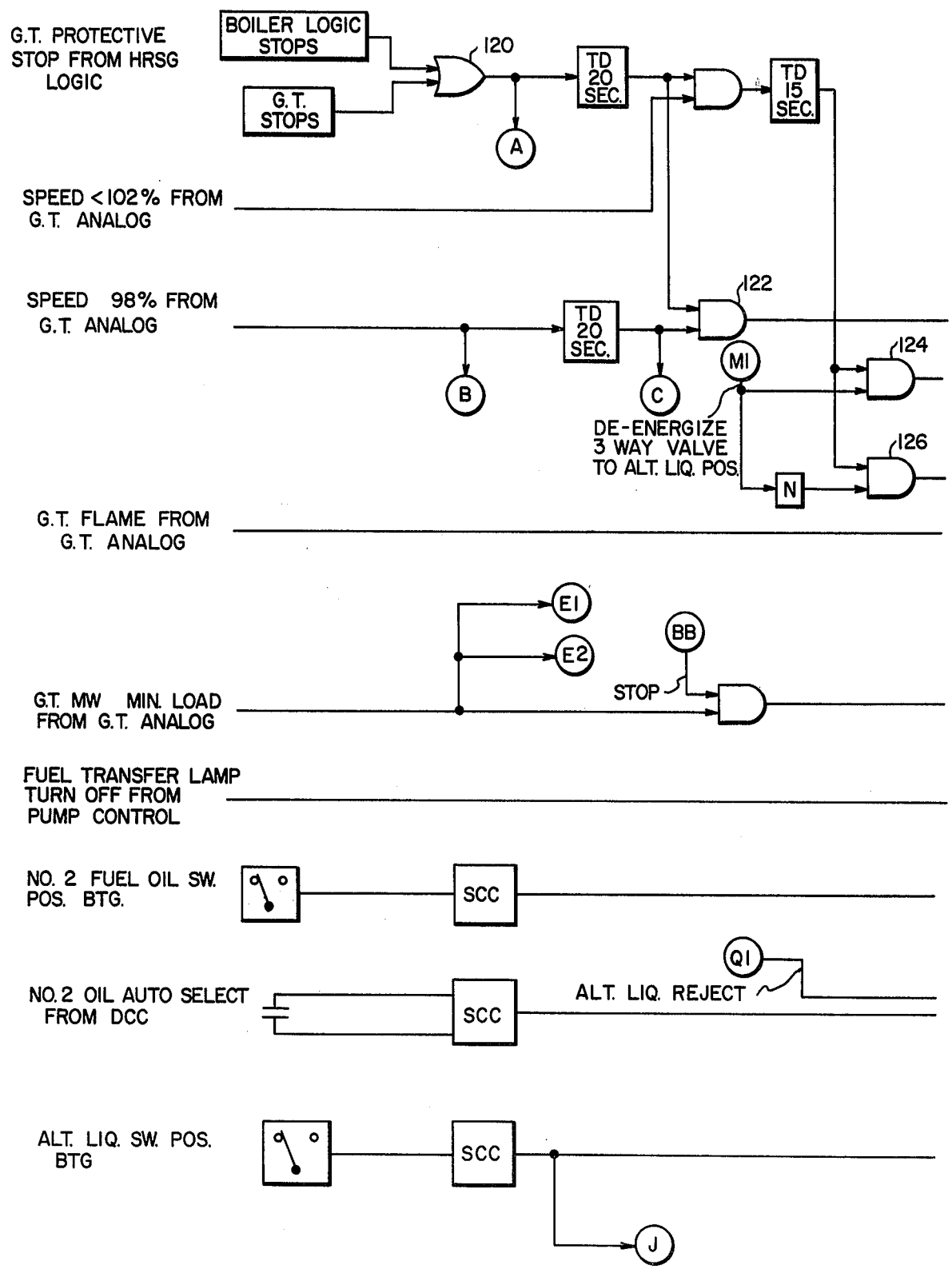
Figure 8B:
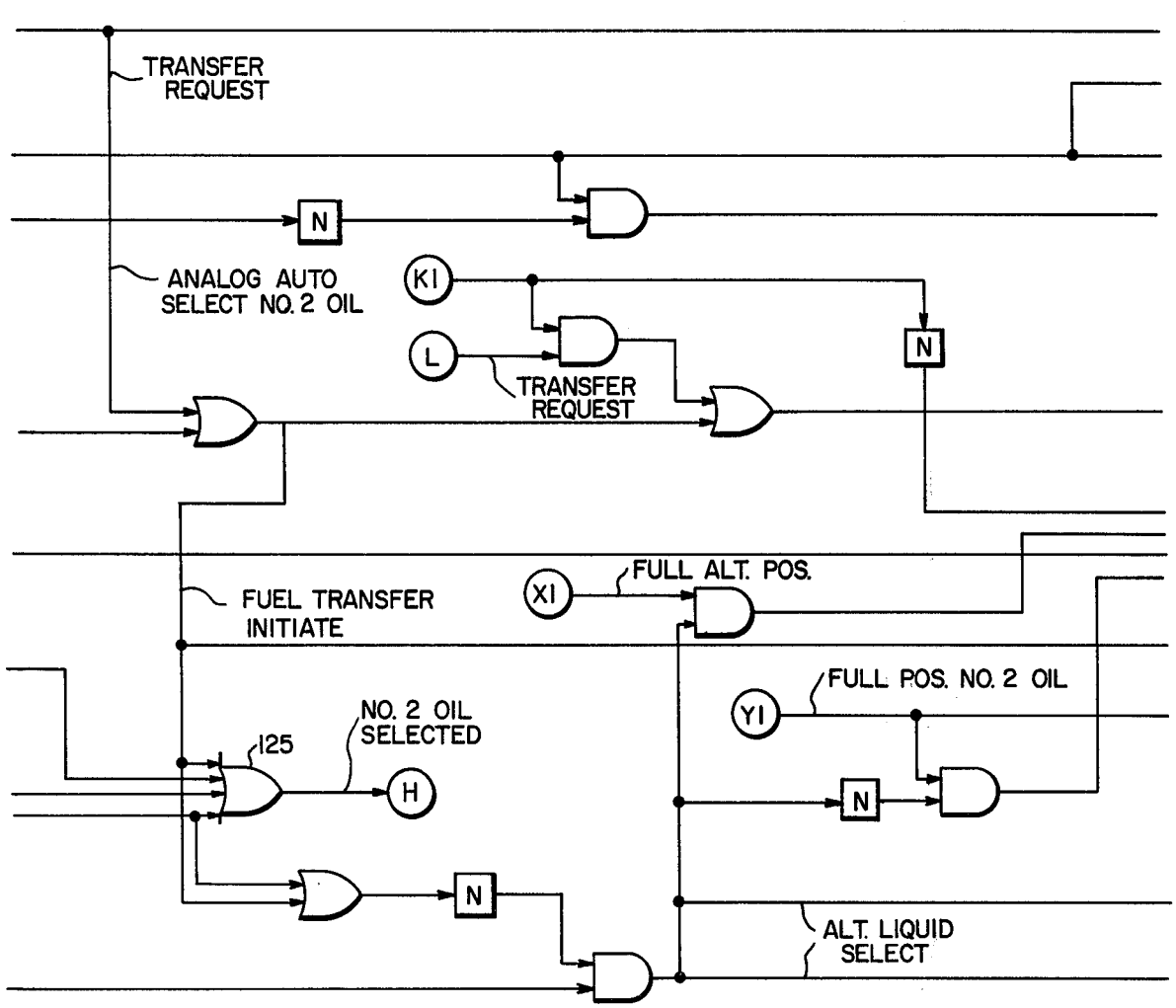
Figure 9A:
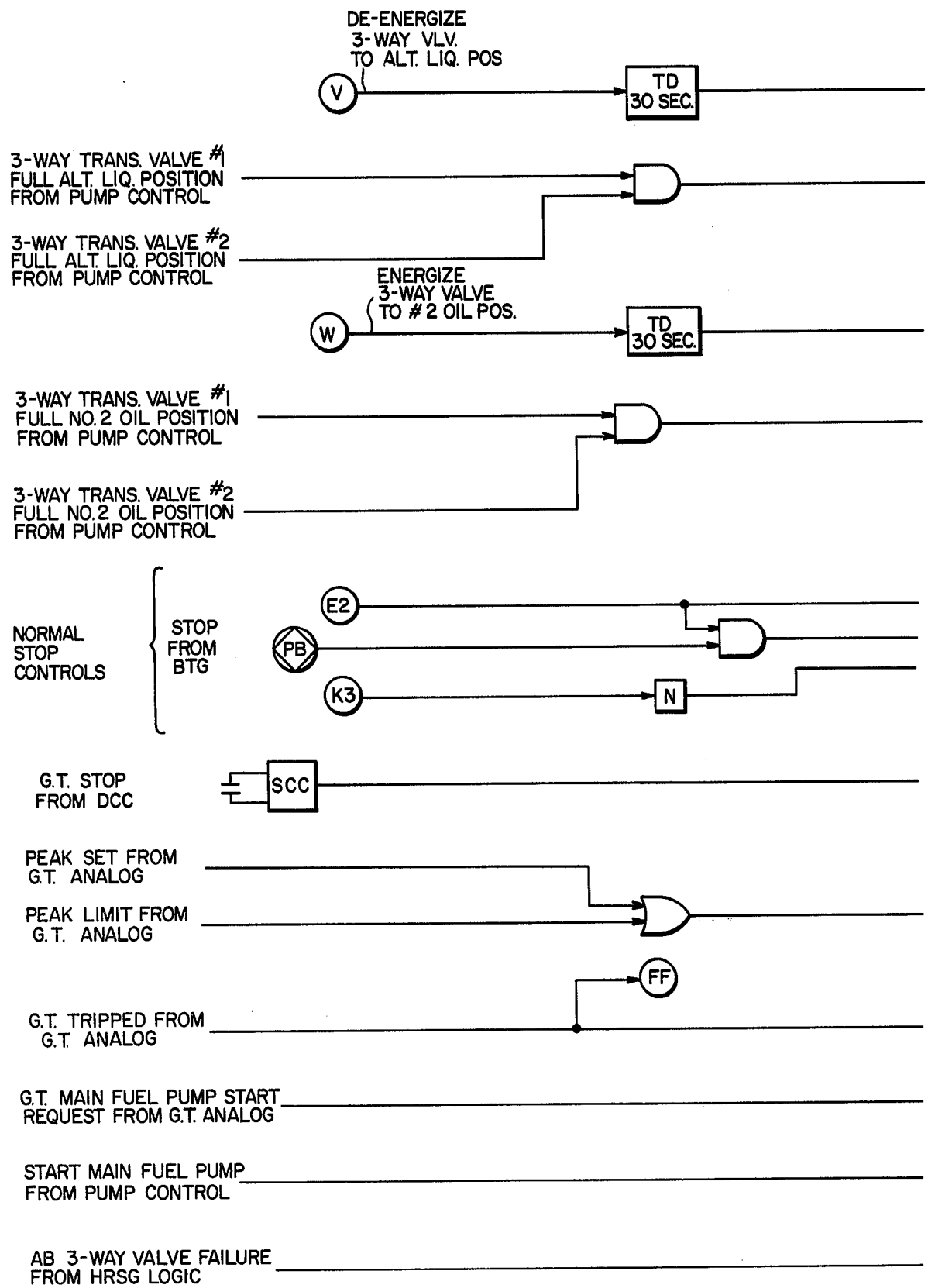
Figure 9B:
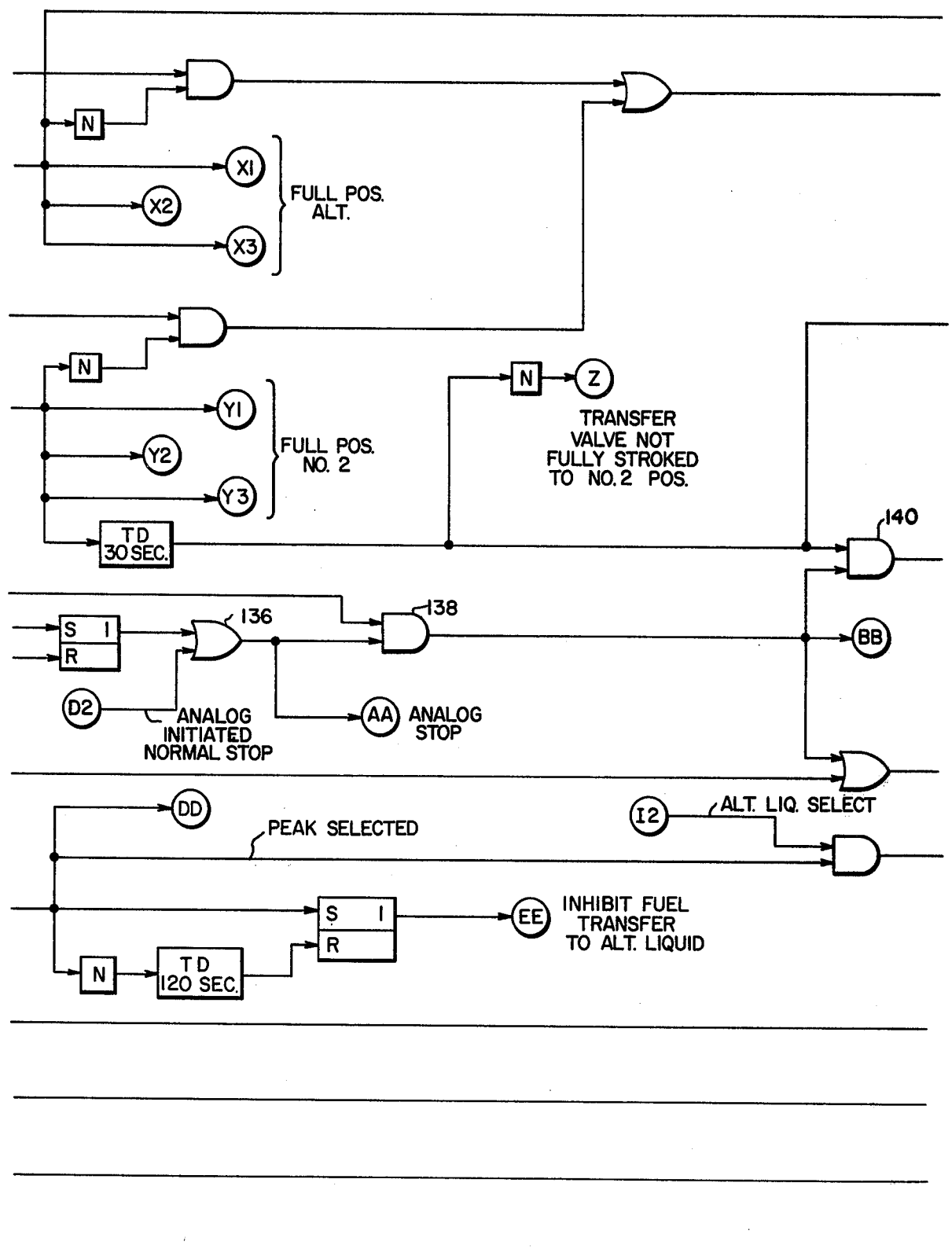
Figure 9C:
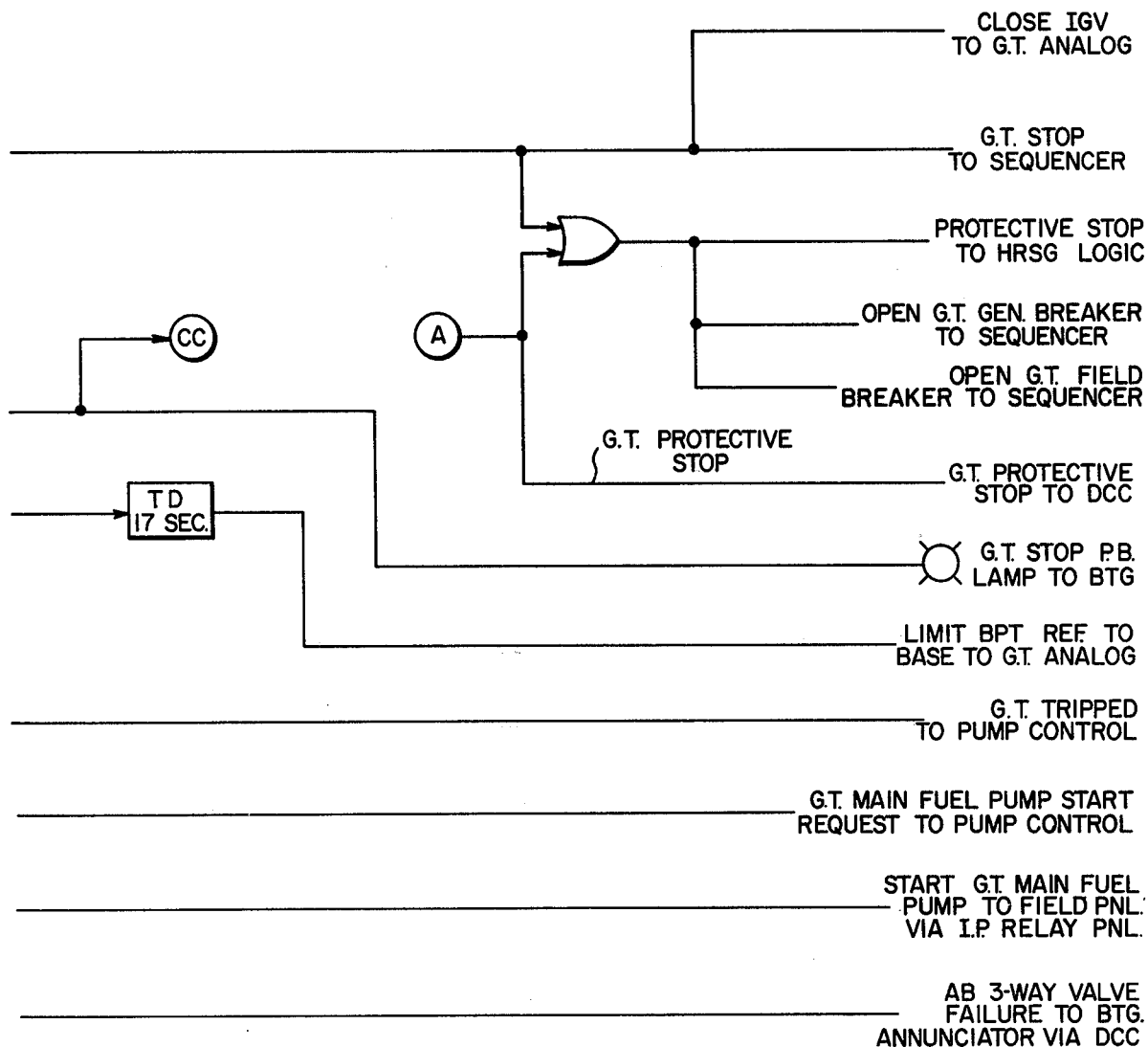

The shutdown controls 33 are shown with greater detail for a particular commercial embodiment in FIGS. 8A–8C, 9A–9C, 10A–10C and 11A–11C. In FIGS. 8A–8C, protective boiler logic or turbine stops initiate an afterburner stop (not indicated in FIGS. 8A–8C) and are applied to an OR block 120. AND block 122 extends the stop to a turbine trip if turbine speed is not stabilized in the allowed time after breaker opening. If speed is stabilized, AND block 124 generates a fuel transfer request through OR block 125. After fuel transfer, AND block 126 initiates a normal stop.

Figure 10A:
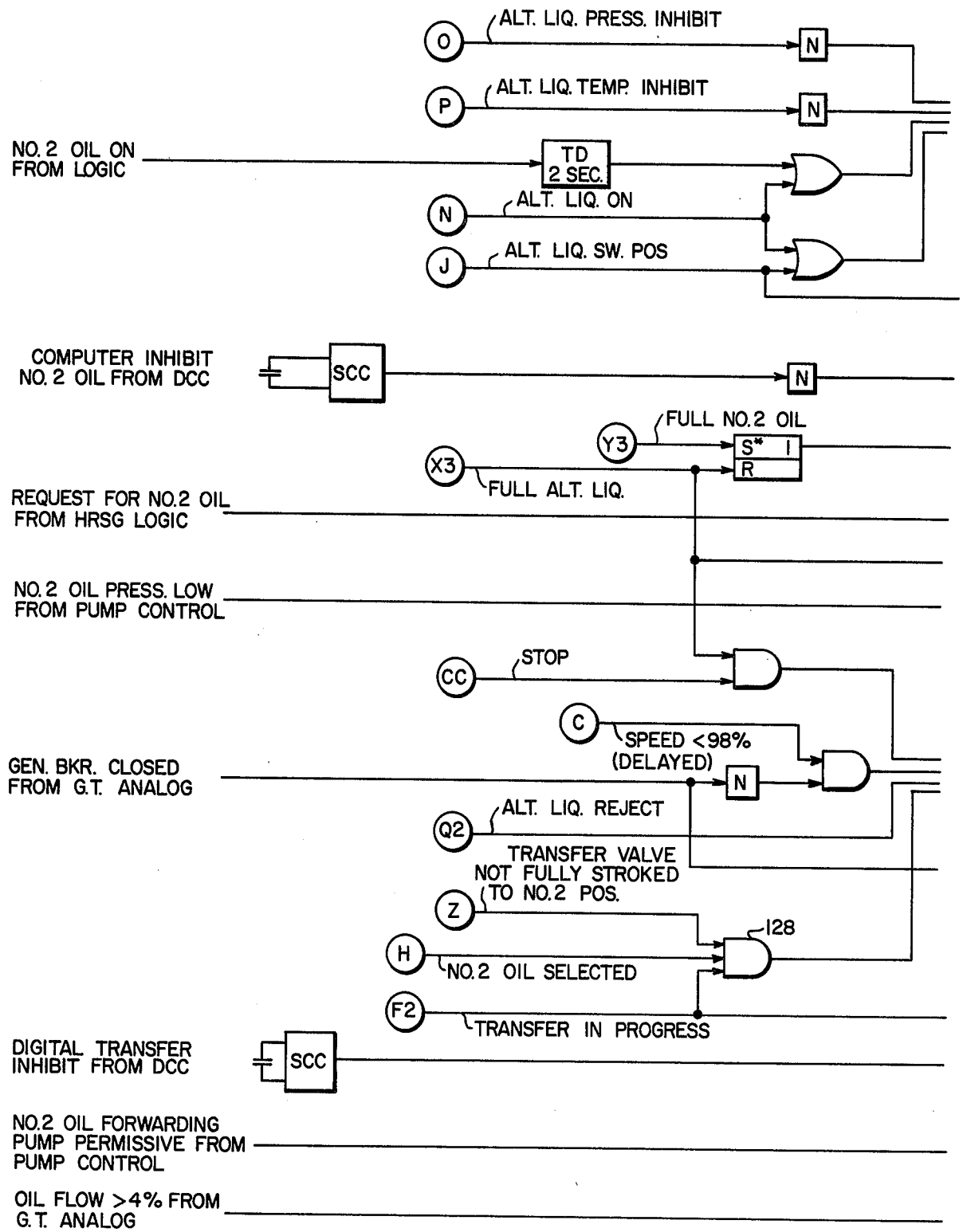
Figure 10B:
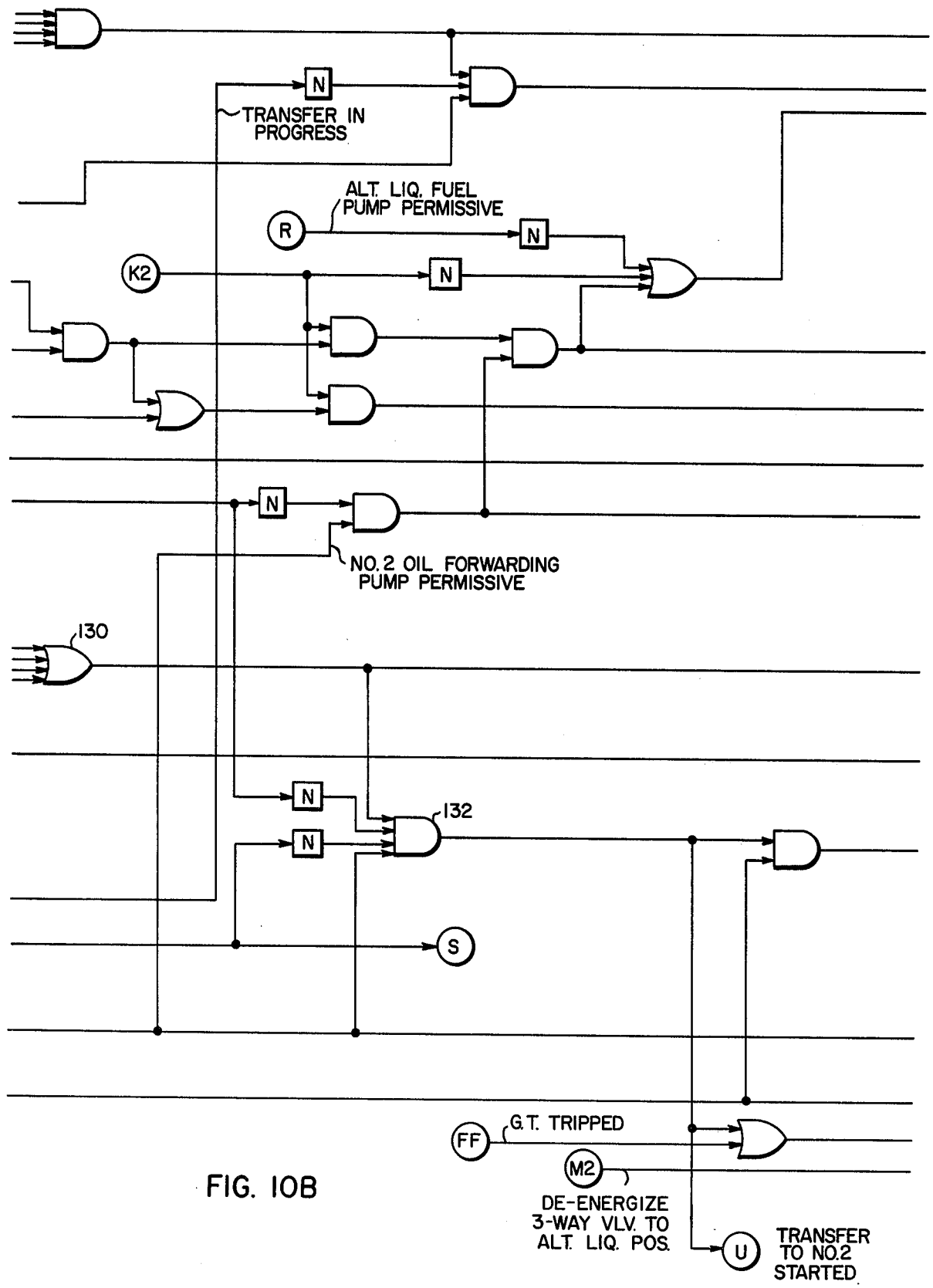
Figure 10C:
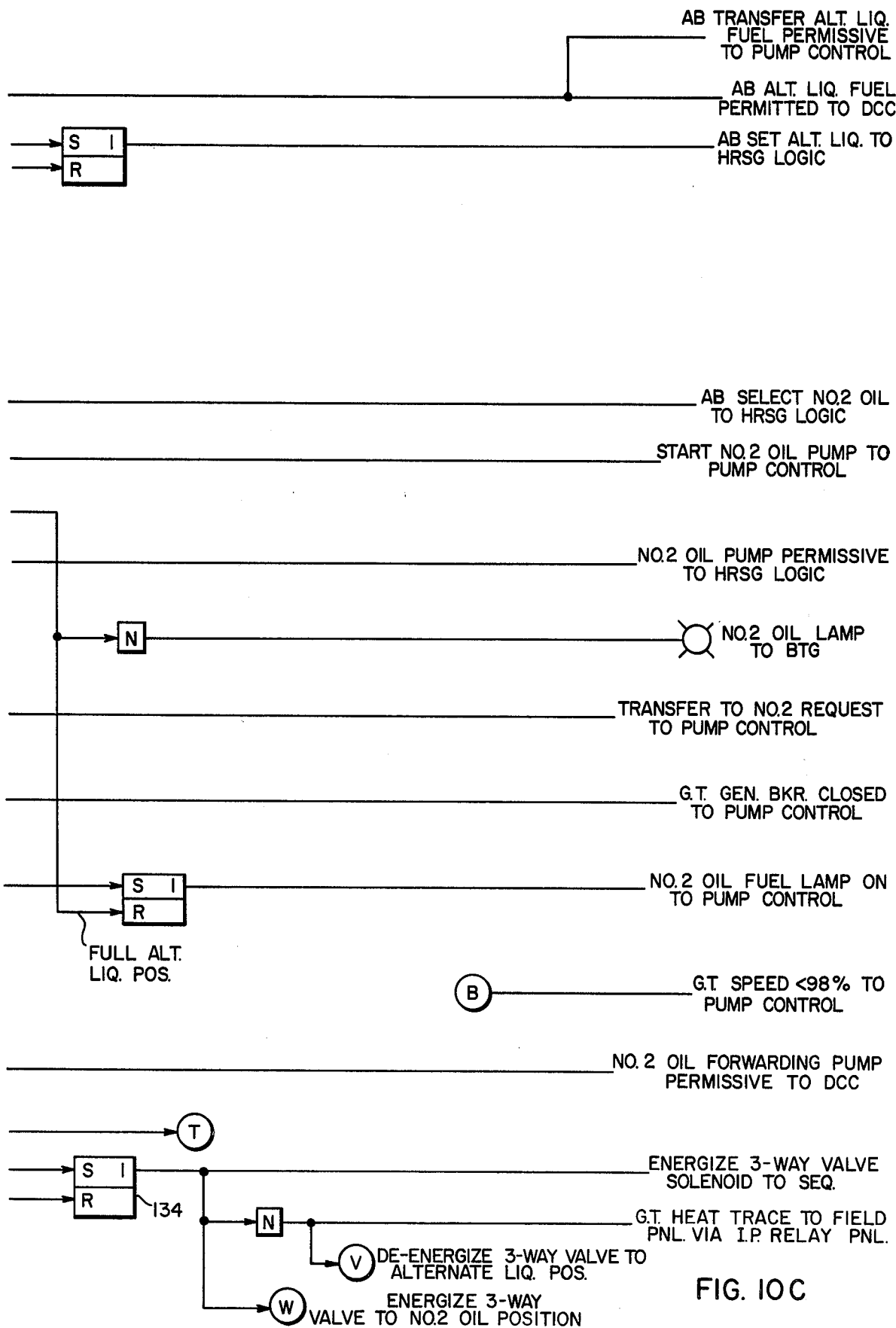

As shown in FIGS. 10A–10C, a request for transfer to flush fuel is processed through AND block 128 which operates OR block 130 only when the AND logic is satisfied.

A transfer request then goes to the pump control if the needed flush fuel pumping capacity is available. Further, AND block 132 operates a flip-flop 134 which moves the 3-way valve 54 from the operating fuel position to the flush fuel position.

Figure 11A:
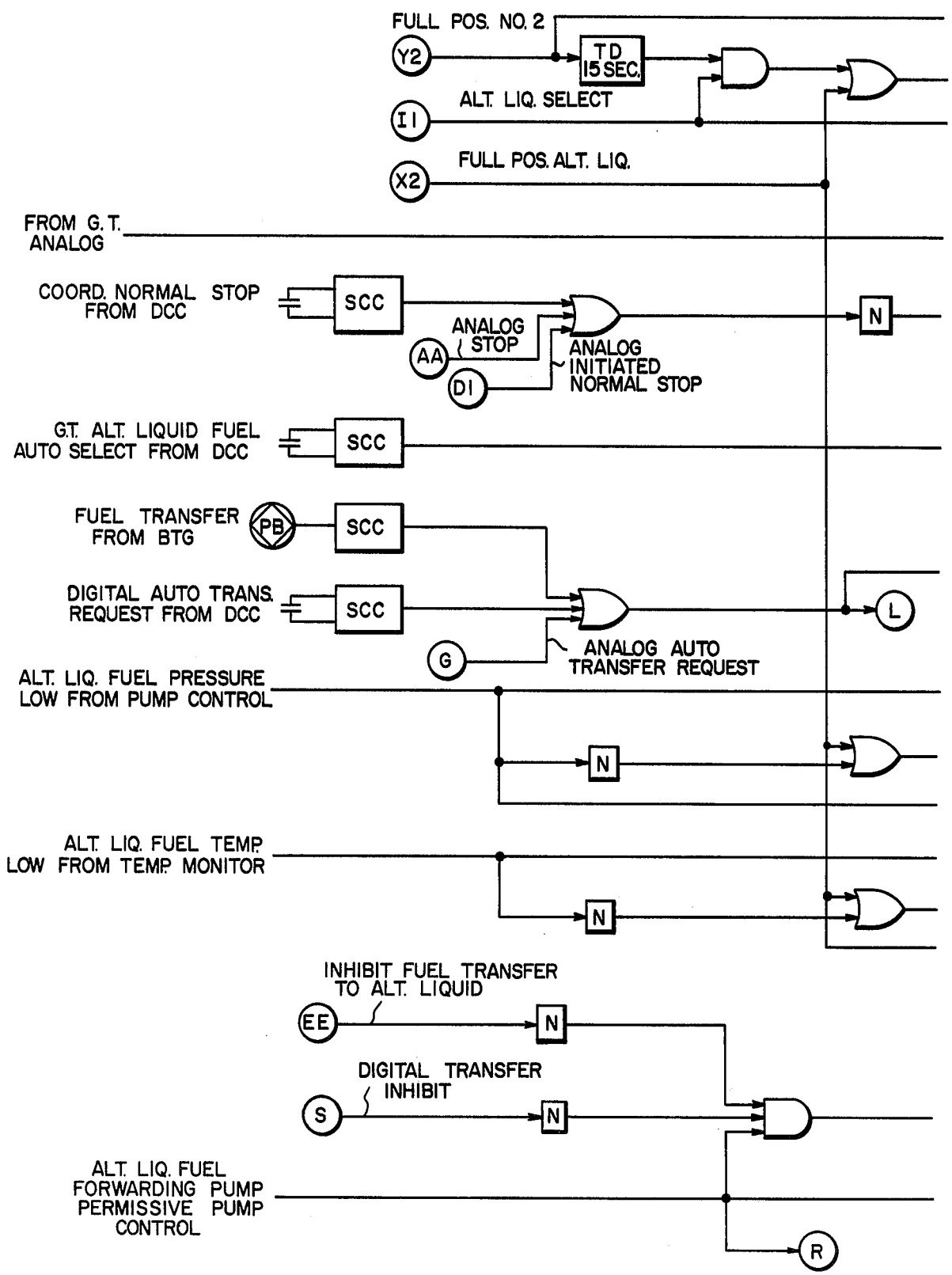
Figure 11B:
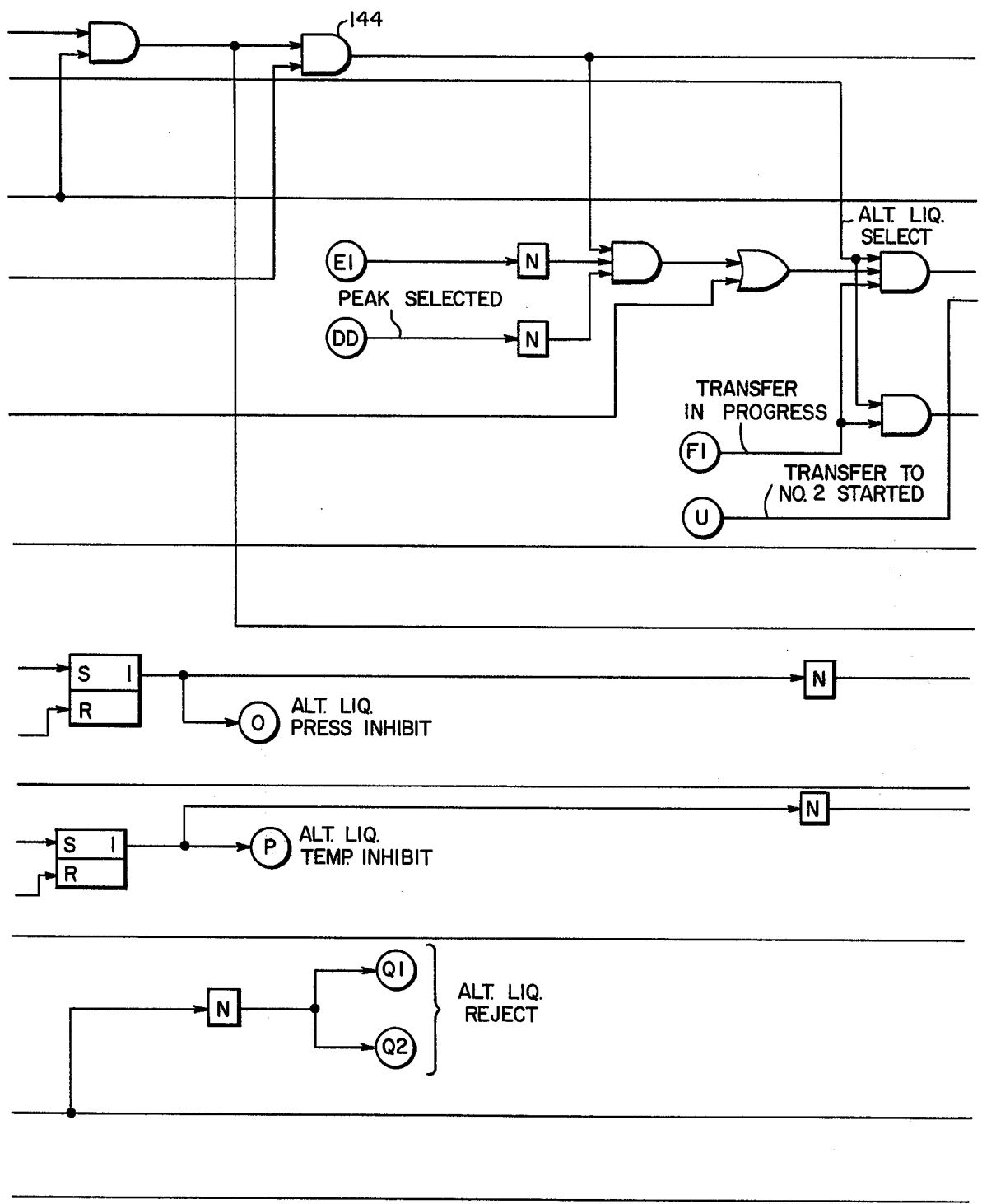
Figure 11C:
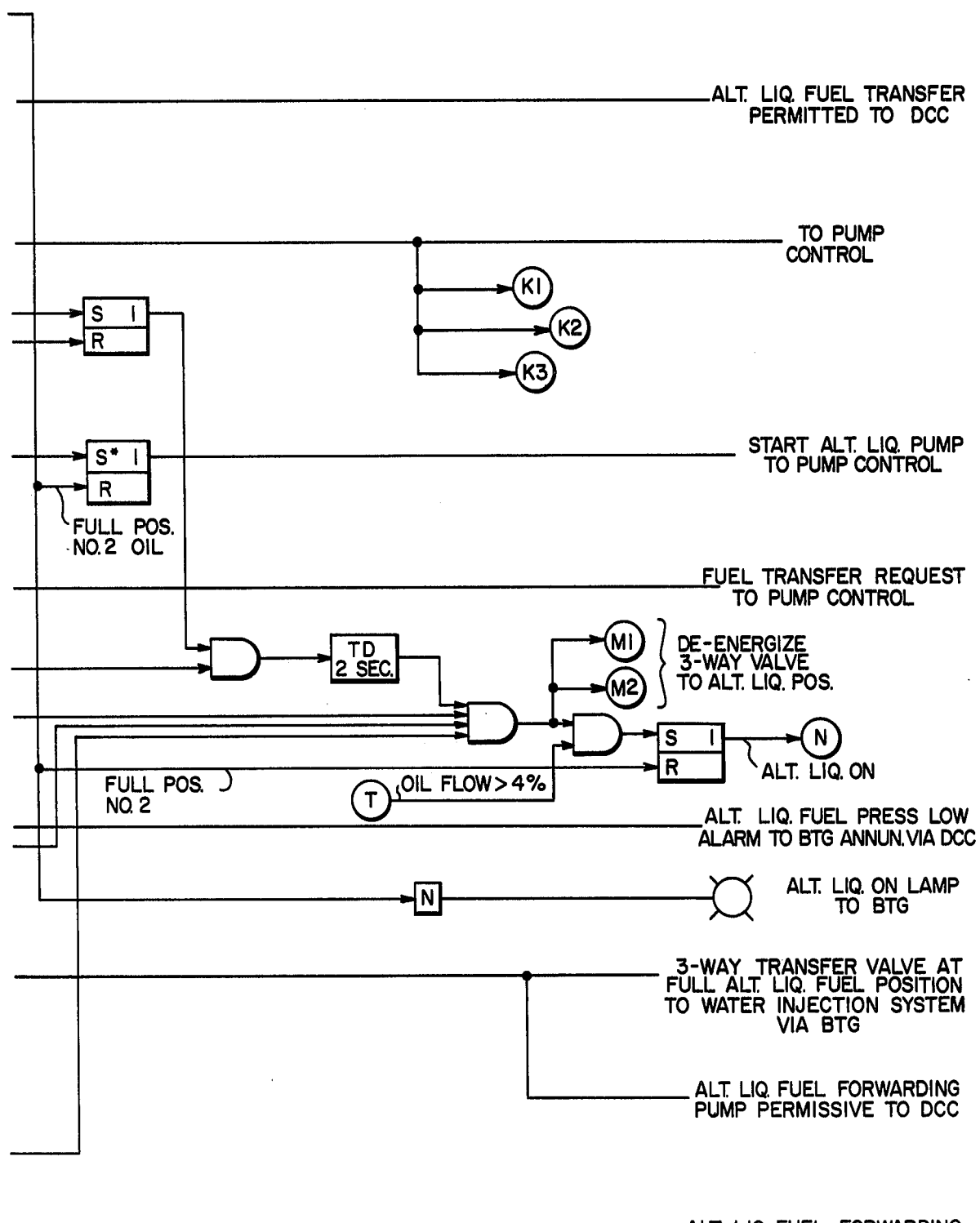

After transfer to flush fuel, OR block 136 (FIGS. 9A–9C) operates AND block 138 if load generation is below the minimum value. A stop signal is then sent to a conventional turbine sequencer through AND block 140 which sequences the turbine to a stop. In FIGS. 11A–11C, OR block 142 acts through AND block 144 to withhold an operating fuel permissive to the digital control during the stop operation.

We claim:

1. A system for operating and shutting down a gas turbine-generator comprising a liquid fuel supply system which selectively supplies an ignition quality fuel or a post-ignition quality fuel to the turbine combustors, a speed/load control for said turbine fuel system to supply fuel to said turbine as required during startup and shutdown and during load operations, means for generating protective turbine stop signals and protective turbine trip signals in response to predetermined sensed conditions, and means for controlling said speed/load control and said turbine fuel system to shut said turbine down in an orderly stepped procedure without setting trips when a turbine stop signal occurs, said turbine shutdown controlling means including means for transferring the turbine supply fuel from post-ignition fuel to ignition fuel during continued fuel burning at a predetermined point in the turbine shutdown so as to flush the post-ignition fuel from the turbine fuel system supply lines, said shutdown controlling means further including means for opening a breaker for the generator, means for stepping back said speed/load control to idle operation, means for generating a signal representative of stable turbine operation in the idle state, and means for generating a fuel transfer signal after generation of the stable idle signal to permit transfer to the flushing fuel.

2. A system as set forth in claim 1 wherein said stable signal generating means includes means for detecting when the turbine speed has stayed within a relatively narrow range near idle speed for a predetermined period of time after a predetermined time delay.

3. A system as set forth in claim 2 wherein means are provided for generating a demand for a normal turbine stop once the turbine speed has stabilized and the flush fuel transfer has been completed.

4. A system for operating and shutting down a gas turbine-generator and an afterburner in a combined cycle plant comprising a liquid fuel supply system which selectively supplies an ignition quality fuel or a post-ignition quality fuel to the turbine combustors, a speed/load control for said turbine fuel system to supply fuel to said turbine as required during startup and shutdown and during load operations, means for generating protective turbine stop signals and protective turbine trip signals in response to predetermined sensed conditions, another liquid fuel system which selectively supplies an ignition quality fuel or a post-ignition quality fuel to the afterburner burners, means for controlling the afterburner fuel during turbine startup and load operations, means for generating afterburner stop signals in response to predetermined sensed conditions, means for controlling said speed/load control and said turbine fuel system to shut said turbine down in an orderly stepped procedure without setting trips when a turbine stop signal occurs and only if the afterburner has been stopped, said turbine shutdown controlling means including means for transferring the turbine supply fuel from post-ignition fuel to ignition fuel during continued fuel burning at a predetermined point in the turbine shutdown so as to flush the post-ignition fuel from the turbine fuel system supply lines, means for controling said afterburner fuel supply system to shut said afterburner down after completion of afterburner fuel transfer in an orderly procedure without setting trips, said afterburner shutdown controlling means including means for transferring the supply fuel from post-ignition fuel to ignition fuel during continued fuel burning after the afterburner has been ramped down to a predetermined minimum value so as to flush the post-ignition fuel from the afterburner fuel system supply lines.

* * * * *